Figure 1:
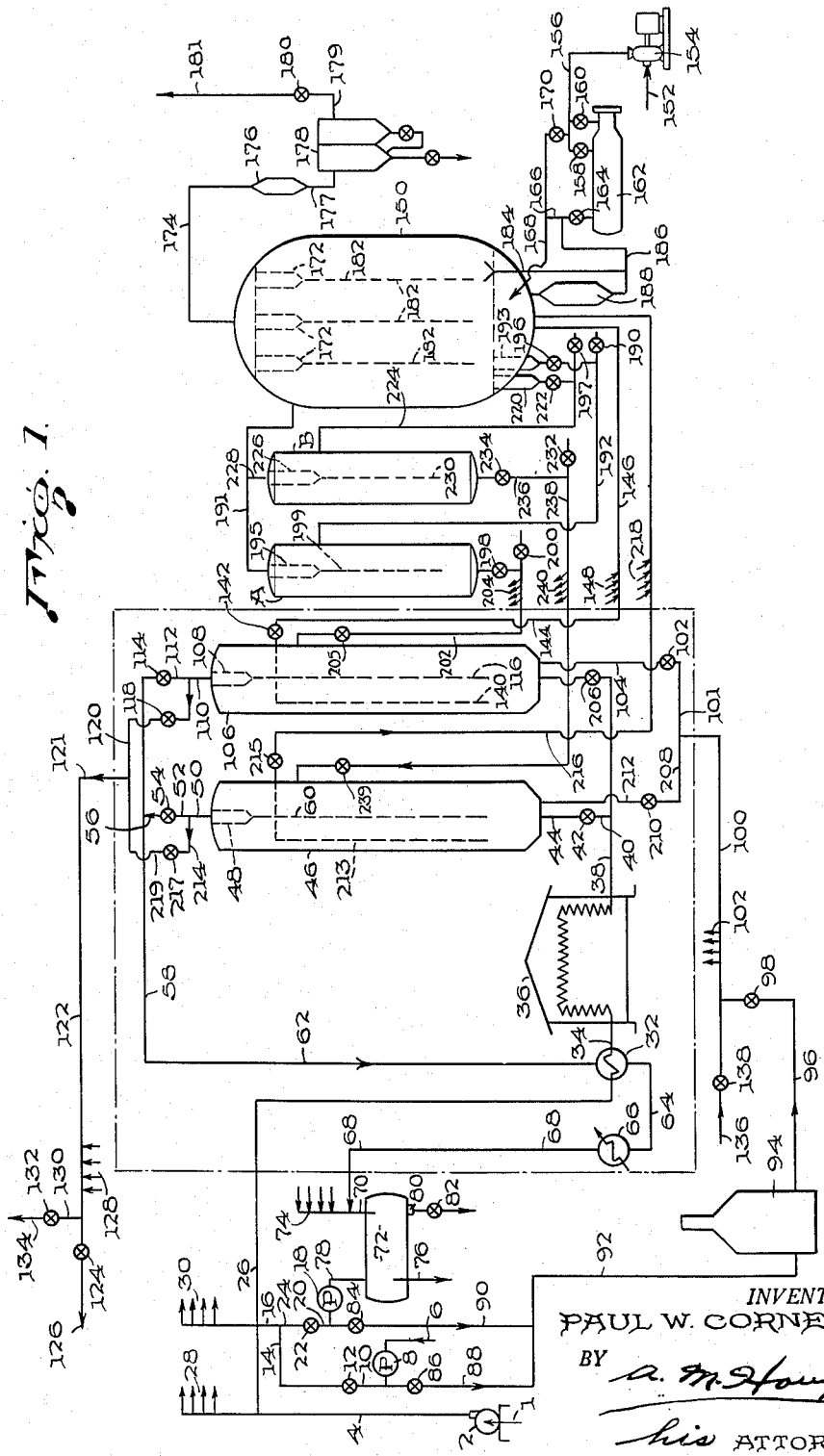

Dec. 29, 1953 P. W. CORNELL 2,664,339
CATALYTIC PROCESS
Filed Jan. 17, 1951 2 Sheets-Sheet 1

INVENTOR.
PAUL W. CORNELL
BY
his ATTORNEY

Dec. 29, 1953     P. W. CORNELL     2,664,339
CATALYTIC PROCESS
Filed Jan. 17, 1951     2 Sheets-Sheet 2
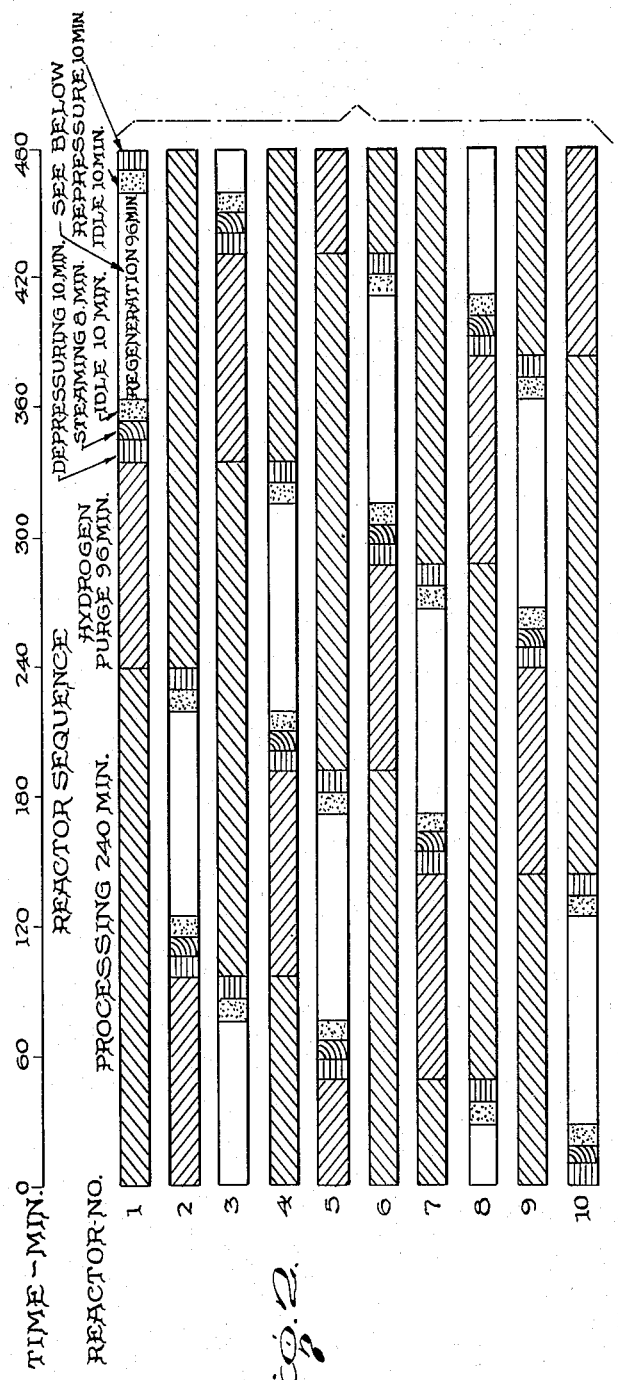
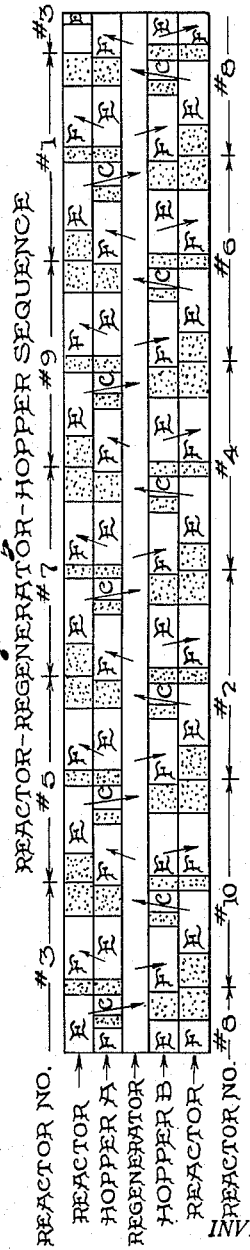
INVENTOR.
PAUL W. CORNELL Patented Dec. 29, 1953

2,664,339

UNITED STATES PATENT OFFICE 2,664,339

CATALYTIC PROCESS

Paul W. Cornell, Pittsburgh, Pa., assignor to Gulf Oil Corporation, Pittsburgh, Pa., a corporation of Pennsylvania Application January 17, 1951, Serial No. 206,426

5 Claims. (Cl. 23—1)

This invention relates to an improved fluidized fixed bed process for carrying out at elevated pressure catalytic conversions whose heats of reaction range from approximately neutral to exothermic.

In my copending application Serial No. 181,431, filed August 25, 1950, I have disclosed a process and apparatus for carrying out catalytic conversions at elevated temperature and pressure and utilizing a reactor containing a fluidized fixed bed of catalyst. When catalyst is sufficiently deactivated to require regeneration, passage of reactants through the bed is terminated and the catalyst is conveyed to a separate regenerating vessel where the catalyst is reactivated. Active catalyst is then transported from regenerator to reactor and reactants are again passed therethrough.

One modification of the above described invention involves the use of an extra amount of catalyst in the regenerator. This invention pertains to that modification. By means of this expedient the reactor may be refilled before regeneration of its spent catalyst is complete. The deactivated catalyst is introduced into the regenerator which contains a bed of more active catalyst in fluidized form. Regeneration of the deactivated catalyst may begin upon its introduction into the chamber. At the completion of the transport period, the regenerator contains one reactor charge of partially regenerated catalyst and an extra amount, advantageously one or more charges, of more active catalyst. The catalyst mixture is of a sufficiently high activity level that a portion may be reconveyed to the reactor for processing operations. As a result, one reactor charge of catalyst is transferred to the reactor while regeneration continues.

In the manner described, the processing period of the fixed-fluid bed reactor may be made substantially continuous except for catalyst substitution operations, i. e., depressuring, purging, catalyst transport, switching, safety lags, repressuring and the like; thus the time necessary for complete regeneration of the spent catalyst has no effect on the amount of off-stream time.

One difficulty with the above described system is the amount of fluctuation of the catalyst bed level in the regenerator. This bed level varies by the amount of one full reactor charge during the regeneration phase. Undue fluctuation in the regenerator is to be avoided, since it causes undesirable pressure fluctuations in the regenerating gas which tend to upset the system. In the above described system, fluctuation may be reduced on a percentage basis by maintaining a relatively large amount of extra catalyst in the regenerator, e. g. if two extra charges are maintained, the fluctuation is about 33 per cent; if three extra charges are maintained, fluctuation is 25 per cent. However, this expedient is limited by economic considerations as to the increased expense of larger regenerating vessels.

One other difficulty encountered in the operation of the process described above is the mixing of active and inactive catalyst in the regenerator, when spent catalyst from the reactor is introduced into the bed of more active catalyst in the regenerator. This has the effect of lowering the overall activity of the catalyst available for return to the reactor.

Since freshly regenerated catalyst is generally at a higher temperature than that desired for the reaction, it is usually desired to cool the catalyst during transport from regenerator to reactor. When the described transport occurs only periodically, the cooler employed is subjected to undesirable thermal strains.

One additional difficulty involves the accurate measuring of a catalyst charge into the reactor. Since the reactors contemplated in the process are relatively heavy walled, being adapted to withstand high pressures, it is difficult if not impossible to provide visible means for determining when the vessel is filled sufficiently.

It is an object of this invention to provide a process which will substantially reduce fluctuation or surging of the catalyst level in the regenerator. It is another object to provide a process which will avoid excessive mixing of spent and regenerated catalyst in the regenerator, thereby raising the activity level of the catalyst returned to the reactor. An additional object is to provide a process which accurately meters the exact amount of catalyst for one charge into the reactor. A further object is to provide an improved cooling method which is more resistant to thermal strains and which enables efficient cooling.

These and other objects are accomplished by my invention which relates to a process for effecting catalytic conversions which has an approximately neutral to exothermic heat balance. The process includes the steps of passing reactants through a reactor containing a fluidized catalyst bed at elevated temperature and pressure. A separate regenerator containing a fluid bed of catalyst at a substantially lower pressure is maintained. The flow of reactants through the reactor is terminated when the activity of the catalyst therein is substantially reduced. The reactor is then depressured. A vessel between the reactor and regenerator is at least partially filled, whereby undue mixing of active and inactive catalyst in the regenerator is avoided. The reactor is emptied, refilled with active catalyst, repressured, and reactants are again passed therethrough. One preferred form of the invention involves putting the reactor back on-stream during at least a part of the time required for regeneration of its spent catalyst. Other preferred modifications involve continuous operation of the regenerator, cooling regenerated catalyst in the metering vessel (preferably with a water-mist); the servicing of a plurality of reactors by a single metering vessel, and/or the operation of at least two banks of reactors, with each bank having an associated hopper, in such a manner that the operation of the reactor banks and the associated metering vessels are alternated or rotated through their several operations. This subject matter is disclosed but not claimed in my copending application Serial No. 131,432, filed August 25, 1950.

Figure 1 presents a diagrammatic arrangement of an apparatus which may be utilized in one preferred modification of the invention.

Figures 2 and 3 are block diagrams illustrating one satisfactory switching sequence for the apparatus illustrated in Figure 1 when carrying out one of the conversion reactions to which the invention is applicable. Specifically, Figure 2 represents a switching sequence for the entire system, while Figure 3 represents the switching sequence for the regeneration phase alone.

In the following description, certain preferred modifications of the invention are set forth. It is to be understood that these are by way of illustration only and are not to be considered as limiting.

In general, my process is applicable to any catalytically promoted conversion reaction which has a heat of reaction varying from exothermic to approximately neutral and which is carried out at elevated pressure. The reason for the limitation as to the heat balance lies in the distinction between a fluidized fixed bed process and a fluidized moving bed process. In the latter the hot regenerated catalyst, continuously introduced into the reactor, provides a means for introducing external heat to an endothermic reaction. In the former type of process the catalyst bed is substantially unrenewed during the on-stream period. Consequently, the present process cannot be used where large amounts of heat must be added to the reaction.

Examples of exothermic reactions to which this invention is applicable are: alkylation, hydrogenation of aldehydes, hydrogenation of phenols, and hydrogenation of carbon monoxide to methane. My invention is also useful in exothermic catalytic conversions of hydrocarbons. Examples of these reactions are non-destructive hydrogenation and addition reactions such as polymerization. My invention is equally applicable to processes having a heat of reaction which is substantially neutral. Examples of these reactions are those in which an exothermic reaction, such as one of those listed above, takes place simultaneously with and to a similar extent as an endothermic reaction, such as catalytic cracking, thereby providing a substantially neutral heat balance. Specific examples of these types of reactions are hydrocracking or destructive hydrogenation, and hydrodesulfurization. My invention is also applicable to certain endothermic catalytic processes which may be carried out in such a manner as to produce a substantially neutral heat balance, e. g., as by preheating the reactants to the necessary degree to compensate for endothermic heat. Examples of endothermic reactions which may be operated in an approximately neutral heat balance region are hydroforming and catalytic reforming in the presence of hydrogen.

In its simplest form my invention involves a catalytic conversion carried out with a single fluid reactor, a single fluid regenerator, an intermediate metering vessel or hopper, and suitable transport lines connecting the vessels. When the catalyst contained in the reactor becomes sufficiently inactive, the flow of reactants is terminated, and the vessel is depressured and purged to remove traces of the reactants. Deactivated catalyst is then conveyed directly or indirectly to the regenerator. If the regenerator is not operating already, it may be starated up during catalyst transport, for example, in order that regeneration may be started as soon as deactivated catalyst particles enter the regenerator.

The intermediate hopper is made use of in order to avoid undue mixing of active and inactive catalyst. For example, the hopper may be placed in series in the transfer line running from the reactor to the regenerator. When employed in this manner, the reactor charge may be completely emptied into the hopper. Following this the reactor may at least be partially refilled from the regenerator before any mixing of active and inactive catalyst has occurred. After the reactor has been at least partially refilled, the intermediate hopper may be emptied into the regenerator.

More generally it is preferred to employ the hopper in series in the transfer line running from the regenerator to the reactor. In these instances, the hopper may be also employed as a cooling and metering vessel for measuring a charge of catalyst into the reactor. In operation the metering vessel or hopper is at least partially filled before transfer of spent catalyst to the regenerator is complete. In a preferred form filling of the metering vessel or hopper is begun prior to the time that transfer of deactivated catalyst from the reactor to regenerator is begun. When the vessel is partially full, the above-mentioned transport of deactivated catalyst is begun. Filling of the hopper is commenced at such a time that the vessel will have been filled to the desired degree, when the catalyst in the reactor has been purged and is ready for transfer to the regenerator.

While the hopper may be filled to any desired degree prior to or after introduction of deactivated catalyst into the regenerator with the accompaniment of many advantages of the invention, this vessel is advantageously filled at least partially and preferably about one-half-filled prior to introduction of appreciable amounts of deactivated catalyst into the regenerator, in order to minimize fluctuation of the catalyst bed in the regenerator.

To illustrate the reduced fluctuation in more concrete fashion, if three extra charges of active catalyst are maintained in the regenerator, a one-half filling of the hopper, which is of a size to contain exactly one reactor charge of fluidized catalyst, will reduce the level of the regenerator bed by 16⅔ per cent.

After the metering vessel is partially filled, say one-half, spent catalyst is introduced into the regenerator from the off-stream reactor while filling of the metering vessel is continued. During this period catalyst is introduced into and withdrawn from the regenerator at about the same rate. Consequently, there is little fluctuation or surging of the catalyst bed level during this period and fluctuation and surging during the entire period is minimized.

When the metering vessel is completely filled, one-half of the deactivated catalyst in the reactor has been conveyed to the regenerator. Emptying of the reactor is continued thereafter. During this latter period the amount of catalyst in the regenerator increases by 16⅔ per cent. Consequently, it will be seen that fluctuation has been reduced to one-half of that encountered in the use of direct transfer lines between the regenerator and reactor, this being accomplished without increasing the capacity of the regenerator.

Another advantage produced by the above described procedure is that the activity level of the catalyst returned to the reactor is raised materially above that produced when complete intermixing of active and inactive catalyst takes place. This is true, since that part of the reactor charge of catalyst first introduced into the metering vessel is drawn from the high activity catalyst in the regenerator. After introduction of deactivated catalyst into the regenerator has begun, the regenerator contains a mixture of relatively high activity catalyst and partially regenerated deactivated catalyst.

In certain reactions to which my invention is applicable, freshly regenerated catalyst may be at a temperature higher than that desired in the reactor. In these instances, it is generally desired to cool the hot catalyst prior to introduction into the reactor. This step may be accomplished in the hopper or elsewhere in the line by the use of conventional cooling means, e. g., cooling tubes or jackets. Since the invention is also applicable to reactions wherein the regenerated catalyst need not be cooled before returning it to the reaction zone, the invention is not limited to those processes involving cooling of the catalyst.

Although the advantages set forth above are present with or without any type of cooling, an objection to the use of conventional cooling means arises (where catalyst cooling is desired) from the fact that intense thermal strains are involved. This will be seen from the fact that while the cooling means operates continuously to cool the vessel, hot catalyst is introduced therein only intermittently. When the extremely hot catalyst contacts the cooling means, the strains caused by the thermal shock are extreme.

In order to overcome this difficulty the invention desirably utilizes an improved cooling method, wherein a fine water-mist or spray is introduced into the metering vessel after filling thereof is completed. Since the hopper is of relatively simple construction, it is better able to stand thermal strains than a conventional cooling tube structure. This will be evident from consideration of a conventional shell and tube bundle. It will be seen that in this structure the tubes act as stays and that any uneven heating of the tubes on one side of the bundle will tend to distort the tube sheet and/or cause the tubes to pull free. Since the hopper contains no integral stays or bracing and since it is of relatively light construction, it is capable of assuming a new temperature condition rapidly. This, of course, avoids thermal strain due to uneven changes in temperature. Water-mist is preferred to steam (although use of the latter is preferable to conventional cooling), in view of its higher cooling capacity per unit.

After the catalyst metered into the hopper is cooled and the reactor is emptied, the reactor may be refilled with cooled reactivated catalyst from the hopper, repressured, and flow of reactants again commenced.

While the reactor may be refilled at any time after emptying, this is advantageously done during at least a portion of the time required for regeneration of its spent catalyst, and preferably as soon as possible after emptying in order to minimize off-stream time. In this manner the processing phase of the reactor may be made continuous except for catalyst substitution operations, i. e., time consumed in catalyst transport, switching, purging, depressuring, repressuring, safety lags and the like. The normal cyclic process would include, in addition to the above, time necessary for complete regeneration of the spent catalyst. The reduction thus made in off-stream time may be very substantial, particularly in processes involving heavy coke laydown, since in these processes regeneration time may be so great as to exceed processing time.

One preferred form of this invention involves continuous operation of the regenerator and is advantageous, since it avoids repeated starting-up. Regeneration is carried out at relatively low pressure within at least periodic simultaneous operation of a reactor at elevated pressure. This modification requires periodic introduction of deactivated catalyst into the regenerator at such times as to provide enough carbon to maintain combustion. This modification could be carried out with one reactor alone where coke loydown is high, but more generally would be carried out with two or more reactors.

The preceding statement indicates another desired form of the invention, wherein a plurality of reactors containing catalyst beds of progressively decreasing activity are rotated through the off-stream phase in such manner that one regenerator and one metering vessel may be made to service a relatively large number of reactors. This mode of operation is preferred, since a constant number of reactors may be kept on-stream, thus providing a constant on-stream capacity.

One modification of the above described mode of operation involves the use of a plurality of banks of reactors with each bank being serviced by its own metering vessel and with all vessels being serviced by one regenerator. The individual reactors of a bank, containing catalyst beds of progressively decreasing activity, are rotated through the regeneration phase one at a time. It is also desirable to rotate the regeneration phase so that regeneration is carried out sequentially on a reactor first from one bank and then the other. Where, for example, two such reactor banks and their associated metering vessels or hoppers are employed, a reactor is taken off-stream first from one bank and then the other. By such operation one hopper may be emptying while the other is filling. Staggering of the hopper operation acts to reduce fluctuation in the regenerator bed.

The operation of one preferred form of the process may be described most easily with reference to accompanying Figure 1. This figure represents a suitable apparatus for carrying out my process as it applies to a preferred modification, hydrocracking, or a species of hydrocracking, hydrodesulfurization. The drawing, in general, represents an apparatus involving the use of ten reactors (five banks of two reactors or two banks of five reactors), serviced by one regenerator. For convenience and clarity only one bank of two complementary reactors has been shown in the drawing, with the apparatus enclosed within the dashed line being utilized in quintuplicate.

In the operation of the illustrated apparatus, charge stock, which may be crude oil for example, is introduced into the system through line 1, pump 2 and line 4. At this stage the charge stock splits into five parallel streams. One-fifth of the charge stock passes into line 26; the other four-fifths pass into the four banks of two reactors (not shown) through parallel lines 28. One reactor in each two is on-stream at all times. Recycle hydrogen enters the system from high pressure flash drum 72, through line 78, pump 18, line 20, through valve 22, and into line 24. Fresh hydrogen, from a hydrogen producing unit (not shown), enters through line 6, pump 8, line 10, through valve 12 and into line 14. The fresh hydrogen is mixed with the recycle hydrogen in line 24 and the mixed stream passes into line 16. At this stage the fresh and recycle hydrogen are also split into five parallel streams, one-fifth of the gas joining the charge stock in line 26, with the remaining four-fifths passing to the four other banks of reactors (not shown) through parallel lines 30. The mixture of charge stock and fresh and recycle hydrogen pass through line 26 and through heat exchanger 32, where they undergo preliminary heating. From heat exchanger 32 the preheated mixture passes through line 34 to heater 36, where it is heated to reaction temperature. The mixture leaves the heater through line 38, passes into line 40, through valve 42, into line 44, and into reactor 46 which contains a bed of finely divided catalyst. The rate of flow of the reactants is such that the catalyst bed may be maintained in a state of turbulent suspension.

Advantageously, the degree of fluidization of the catalyst within the reactor may be much less than that normally encountered in conventional fluidized bed operation. By means of this expedient, the size of the reactor (and thus the cost thereof) may be reduced considerably. The savings in equipment are particularly appreciable in the case of reactions such as hydrocracking or hydrodesulfurization which are carried out at high pressure in thick-walled vessels.

The converted reactants pass out of the reactor through cyclone separator 43 into line 50 and line 52, through valve 54, line 56, and into line 58. The bulk of the catalyst within the reactor is desirably maintained in a relatively dense phase in the lower part of the vessel. Consequently, the converted reactants flowing out of the reactor are relatively free of catalyst, except for fines produced by attrition, with the bulk of the catalyst being separated in the disengaging space above the dense phase. These fines are separated from the converted product in cyclone separator 48 and are returned to the main catalyst bed through standpipe 60.

The converted product passes from line 58 into line 62, and through heat exchanger 32, where the hot product acts to preheat the charge stock and hydrogen entering the system. The partially cooled product passes out of heat exchanger 32 into line 64 and into cooler 66, where it is further cooled. From the cooler the converted reactants pass into line 68, line 70 and thence into high pressure flash drum 72. Numeral 74 represents the parallel streams of converted product from the four banks of reactors not illustrated in the drawing. In drum 72 the hydrogen contained in the product is flashed off through line 78, from which it re-enters the system as recycle hydrogen. Any water that is produced in the system is collected in trap 80 and may be drawn off through valve 82.

The liquid product in high pressure flash drum 72 passes out through line 76 to a low pressure flash drum and other conventional product recovery equipment not shown. Any hydrogen sulfide formed in the conversion process is flashed off from the low pressure flash drum along with other dissolved gases and may be separated from the latter in any conventional manner, such as absorption into a basic amine solution. The remaining liquid in the low pressure flash drum may then be split into the desired fractions.

The conversion of the hydrocarbons within the reactor is accompanied by coke laydown on the catalyst. When this carbonaceous deposit has become sufficiently great to deactivate the catalyst substantially, regeneration is carried out. In the illustrated apparatus this is accomplished by closing valve 42 and switching the flow of reactants through valve 206 into the complementary reactor 106 of the pair, this vessel containing active catalyst. Reactor 46 is then hydrogen purged by passing recycle hydrogen through valve 84, line 90 and into line 92. Whatever fresh or make up hydrogen is necessary may be added from the hydrogen producing unit through valve 86 and line 88. The fresh and/or recycle hydrogen are preheated to the temperature required for purging in heater 94 and passed into line 96 through valve 98 into line 100. Lines 102 lead to the four banks of reactors not shown, and are utilized individually when the reactors in these banks are ready for hydrogen purging. From line 100 the purge hydrogen passes into line 208, through valve 210, into line 212, and into reactor 46. Purging temperature may be of the order of the reaction temperature or higher.

The hydrogen purge step in a hydrocracking or hydrodesulfurization process has several functions. One function is to sweep the remaining reactants and converted product out of the reactor. Another function is to effect a further hydrogenation of unconverted or incompletely converted charge stock. Still another function is to hydrogenate a portion of the coke deposited on the catalyst into useful liquid products. In addition, a portion of the coke which is not converted to liquid product may undergo a certain amount of hydrogenation and therefore may be more easily burned off in the regenerator. Hydrogen purging is not essential to the process and may be omitted, if desired. In such cases the coke would be removed during regeneration only.

When the catalyst and reactor are sufficiently purged, the reactor is blocked off by closing valves 210 and 54, and the reactor is depressured through line 50, line 214, valve 217, line 219, line 121, and into line 122. From line 122 the depressured gases and liquid products pass through valve 124, line 126, and into the low pressure flash drum and other product recovery equipment, not shown. Numeral 128 refers to the lines parallel to line 121 and leading from the other four banks of reactors.

After depressuring, the reactor is steam purged to remove vestigial hydrogen and hydrocarbons remaining in the reactor and in the catalyst bed. This is accomplished by closing valve 98 and introducing steam into line 136, through valve 138, into line 100, through line 208 and valve 210, into line 212 and into the reactor 46. The steam and purged materials pass out of the reactor through cyclone separator 48 into line 50, into line 214, and thence into line 122. From line 122 the gas passes through line 130, valve 132 and line 134, to a vent.

At the completion of this step, valve 217 is closed, valve 215 is opened and steam flow is continued into the reactor at a rate sufficient to blow the catalyst out of the reactor through line 213, through valve 215, and into line 216. Numeral 218 refers to four parallel catalyst transport lines leading from the non-illustrated four banks of reactors. From line 216 catalyst passes into regenerator 150 which contains a bed of fluidized catalyst undergoing regeneration.

For starting up the regenerator, air is introduced through line 152, pump 154 and into line 156. A portion of the compressed air is directed through line 156 and through valve 160 to supply air for the burner. The remaining portion of the air from line 156 passes through valve 158 into air heater 162, where it is heated to a temperature sufficient to ignite the carbon on the deactivated catalyst. From heater 162 the air passes through valve 164, into line 166, and into line 168. From line 168 the heated air enters the regenerator 150. Since regeneration is exothermic, the air heater may be blocked off by closing valves 158, 160 and 164, after combustion has been commenced in the regenerator, and opening valve 170 to permit unheated air to pass directly to the regenerator.

Contaminants (which may include sulfur as well as carbon) are burned off the catalyst in the regenerator. The flue gas, containing a small portion of catalyst, passes out of the regenerating vessel through cyclone separators 172 and into line 174. A portion of the entrained catalyst is separated from the flue gas and returned to the main catalyst bed by way of standpipes 182. Flue gas is partially cooled in cooler 176, from which it passes through line 177 into Cottrell precipitator 178, where the last portion of catalyst fines is separated out. Catalyst-free flue gas leaves Cottrell precipitator 178 through line 179, through valve 180, and is exhausted through line 181.

In the presently described preferred form of the invention, additional catalyst is maintained in the regenerator at all times in order to reduce percentagewise the amount of fluctuation or surging in the catalyst bed level during transfer operations and to allow substantially continuous functioning for the reactors. Undue fluctuation is to be avoided in order to minimize or eliminate undesirable pressure fluctuation tending to upset the system. The amount of catalyst over and above that necessary for return to the reactors and maintained in the regenerator may vary quite widely. The minimum should be such as to reduce the percentage of fluctuation or surge substantially. The maximum is governed only by economic considerations as to the size of the regenerating vessel. In the presently described preferred modification the regenerator is of a size sufficient to contain three charges of catalyst, or two charges more than are necessary for return to a given reactor. By means of this expedient, fluctuation at most would amount to 33⅓ per cent. As mentioned previously and as further shown hereinafter in a particularly described preferred switching sequence, this fluctuation can be further reduced by simultaneously withdrawing and introducing catalyst into the regenerating vessel during a portion of the catalyst transport period.

In order to prevent damage to the catalyst particles through overheating, a cooling means is provided in combination with the regenerator. Hot catalyst at the bottom of the regenerator continuously passes out of the vessel through line 184. A portion of the air from line 168 is diverted through line 156 and line 186 in order to force the catalyst at the bottom of line 184 through the cooler 188 and back into the regenerator.

After transfer of the deactivated catalyst has been completed from reactor 46 to regenerator 150, the flow is reversed by opening valves 232 and 234. Steam is introduced into line 238 through valve 232 and serves to convey reactivated catalyst from previously filled hopper B through line 238 and valve 239 into reactor 46.

Hopper B, one of a pair of such vessels, is filled from regenerator 150 by opening valves 222 and 197 and introducing steam into line 224 through valve 197. Reactivated catalyst passes from collector 220 through line 224 into hopper B. Filling of the hopper is initiated prior to emptying of reactor 46, and the latter portion of its filling period overlaps the first portion of the emptying period of reactor 46. Numeral 240 denotes parallel lines to the other four reactors serviced by hopper B.

These hoppers operate alternatively, and in the presently described preferred modification, each hopper serves one bank of five reactors. The functions of hopper B and its companion hopper A are two-fold. The first of these is to measure the exact amount of catalyst necessary for one charge to a reactor; the second function is that of cooling the catalyst, as previously described. Since the regeneration is carried out at a temperature substantially above that employed in the reactor, the hot catalyst must be cooled before returning to the reactor for reuse in an on-stream phase. This may be accomplished advantageously, for example, by introduction of water and an inert carrier gas into the hopper. The inert gas acts as an atomizing medium. The water is vaporized and serves to cool the catalyst. The inert gas, if desired, may be carbon dioxide and supplied from the hydrogen producing plant.

The catalyst is maintained in fluidized form within the hopper by the flow of gases.

Purged flue gas and cooling gases pass out of the vessel through cyclone separator 226, into line 228, through line 191 and into the regenerating vessel. The bulk of any catalyst particles carried along with these gases and not separated in the disengaging space is separated in cyclone separator 226 and returned to the main body of catalyst through standpipe 230.

When the transfer from hopper B to reactor 46 is complete, the reactor is repressured with fresh and recycle hydrogen from line 100, through line 208, through valve 210, into line 212, and into reactor 46. At this point the catalyst, in reactor 106, is sufficiently deactivated to require regeneration. Therefore, the flow of charge stock and hydrogen is switched from reactor 106 to reactor 46 by closing valve 206 and opening valves 42 and 54.

When reactor 106 is on-stream, the flow of reactants is similar to that through reactor 46, with charge entering the reactor through valve 206 and then into the catalyst bed. Cyclone separator 108 and standpipe 116 operate similarly as their corresponding elements in reactor 46. The flow of converted reactants from reactor 106 is through line 110, line 112, valve 114 and into line 58, from which it follows the course described for converted product leaving reactor 46.

As stated previously, the catalyst contained in reactor 106 has been sufficiently deactivated to require regeneration. Accordingly, it now undergoes a similar sequence of steps as was described for reactor 46. The catalyst is subjected to hydrogen purge from line 100 through line 101, through valve 102, into line 104, and into reactor 106. The purge hydrogen and converted product pass through cyclone separator 108 and into line 58 from which they pass to product recovery equipment in a manner similar to that described with regard to reactor 46.

At the completion of the hydrogen purge the reactor is blocked off by closing valves 102 and 114 and is depressured through line 126 by way of valve 118, lines 120, 121, and valve 124, and through the low pressure flash drum (not illustrated). At the end of the depressuring step, valve 98 is closed and steam is passed through lines 136, 100, 101 and 104, and into the reactor similarly as for reactor 46.

Upon completing the steam purge, valve 118 is closed and the flow of steam is continued into the reactor at a rate sufficient to force the catalyst out through line 140, valve 142, and into line 146. Numeral 148 refers to four parallel lines serving the four other reactors utilizing catalyst transport line 146. From line 146, the deactivated catalyst from reactor 106 passes into regenerator 150.

After this transfer is complete, reactivated catalyst is transported from previously filled hopper A by opening valves 198 and 200. Steam is introduced through valve 200 and serves to convey cooled, reactivated catalyst from hopper A through line 202 and valve 205 into reactor 106. Numeral 204 refers to parallel lines leading to the other four reactors serviced by hopper A. As in the case of hopper B, filling is initiated prior to transfer of deactivated catalyst from reactor 106 to regenerator 150, with the latter portion of the hopper's filling period overlapping the first portion of the reactor's emptying period.

Catalyst is transported to hopper A by opening valves 196 and 190. Steam is introduced into line 192 through valve 190, and catalyst from collector 193 passes through valve 196 and into line 192. From line 192 the catalyst enters hopper A, whose functions are as those described for hopper B.

When reactor 106 has been refilled, complementary reactor 46 has been on-stream for a period of time sufficient to deactivate the catalyst substantially. Accordingly, reactor 106 is repressured through valve 98 and line 100 similarly as was reactor 46, and the flow of reactants is switched from reactor 46 to reactor 106. The cycle is then repeated.

The overall scheme of operation for the ten reactor system may be explained most readily by reference to Figures 2 and 3. Figure 2 shows a time scale above a block diagram which sets forth the reactor sequence. For convenience, the ten reactors in this figure and in Figure 3 have been designated by numbers 1 through 10. The time scale has been correlated with the reactor sequence diagram, in order that the operations in any reactor may be determined at any given time.

An inspection of the block diagram shown in Figure 2 will illustrate that the processing time for reactor 1 comprises two hundred forty minutes on-stream and ninety-six minutes for hydrogen purging, while the regeneration period totals ninety-six minutes. Depressuring and repressuring consume ten minutes each while steam purging is completed in eight minutes. An idle period of ten minutes has been allowed at either end of the regeneration period. The sequence for each reactor is similar.

The general system of operation is that five reactors are on-stream at any given time, while the remaining five reactors are at some other phase of operation. For example, at time zero reactors 1, 4, 6, 7 and 9 are on-stream, while reactors 2, 3, 5, 8 and 10 are at some other phase of operation. Of the latter group, reactors 3 and 8 are actually in some portion of the regeneration period of ninety-six minutes. It will also be seen that the on-stream periods of the various reactors are staggered in such a manner that only one of the ten reactors goes off-stream at one time. Accordingly, the activity level of the catalyst contained in each of the on-stream reactors is at a progressively decreasing degree. In this manner, a minimum sized regenerator and catalyst transport system may be utilized. Of the ten reactors, reactors 1 and 2 constitute a complementary pair; reactors 3 and 4 constitute a similar complementary pair, and so on. This will be clearly seen from a comparison of processing periods for the complementary pairs of reactors.

Referring now to Figure 3, the block diagram illustrated represents the switching sequence carried out during each ninety-six minute regeneration period. This block diagram is correlated with Figure 2 and the time scale, so that each ninety-six minute regeneration period in Figure 2 is directly above the corresponding portion of Figure 3. The regenerator switching sequence in Figure 3 is believed to be self-explanatory. Therefore, it will be sufficient to point out several of the more important features.

Of interest is the fact that hopper A provides catalyst for reactors 1, 3, 5, 7 and 9, while hopper B operates in conjunction with reactors 2, 4, 6, 8 and 10. While reactor 1, for example, is emptying into the regenerator, hopper A has completed about one-half of its refilling from the regenerator, and continues to fill during the first half of the emptying period of reactor 1, thus decreasing the aforementioned fluctuation of the catalyst bed in the regenerator.

Considering the hopper sequence, there is provided a six minute switching and idle period, after which the cooling described above proceeds for ten minutes. Another six minute switching and idle period follows. The cycle is regulated so that emptying of the reactor 1 and the cooling of the hopper A are carried out simultaneously. After the six minutes allowed for the switching and variations in the cycle, hopper A then empties into reactor 1. After another idle period to allow for variations in the preceding operation, switching and the like, hopper A then proceeds to refill and reactor 3 undergoes the sequence described for reactor 1. Since for regeneration purposes, the plant has been divided into two banks of five reactors, it will be seen that a similar sequence of operation is also being conducted for hopper B and the even numbered reactors. This sequence is staggered so that the emptying of one hopper is proceeding at approximately the same time as the filling of the other hopper.

A considerable amount of idle time has been incorporated into the switching sequence ahead of each basic operation to permit a safeguard against upsets in the preceding operation.

While there is catalyst flow into the regenerator for a period of thirty minutes, the sequence that follows involves flow out of the regenerator for thirty minutes to the hopper serving the opposite bank of five reactors. A reactor from this bank begins emptying into the regenerator during the latter portion of the hopper filling period. In other words there is a substantial overlap between the flow to a hopper out of the regenerator and the flow to the regenerator from a reactor in the bank served by the hopper. Because of the manner in which the two banks are staggered, there is flow into and out of the regenerator simultaneously, or an overlapping between the flow of a reactor and the flow of a hopper in the same bank for a period of fourteen minutes. This expedient serves to reduce fluctuation in the regenerator and avoids undue mixing of active and inactive catalyst.

The diagram illustrates that the regenerator operates continuously, with catalyst being transported into and/or out of the vessel at all times, except for switching legs.

It is obvious that the invention is not limited to any particular number of reactors. The principal considerations necessary with respect to the number of reactors, where continuous operation of the regenerator is desired, are that this number is sufficient to provide a substantially constant on-stream capacity for processing charge stock, and that the number is sufficiently great that reactors may go off-stream often enough to provide for continuous operation of the regenerator. The intervals at which the reactors go off-stream are, of course, related to the amount of coke laydown and catalyst activity. In a process not requiring regeneration at the frequent intervals described in the proposed switching sequence, a proportionately larger number of reactors could be serviced by a single regenerator. Such a process could also be operated with a larger percentage of reactors on-stream at one time.

In general, I contemplate using catalysts and working conditions usually employed by the art in connection with the specific type of process being carried out. These catalysts and conditions are well known, and therefore, it is not considered necessary to list them in detail. However, for the purpose of illustration, a few examples of catalysts which may be used in certain preferred modifications will be given. In one preferred modification of my invention where a hydrocracking process is carried out, examples of satisfactory catalysts are compounds of vanadium, chromium, tungsten, zinc, titanium, tin, molybdenum and zirconium, preferably composited with a carrier to give the desired density and size for fluidized fixed bed operations. These catalysts are given merely by way of example; other catalysts known for the purpose may be used with equal facility.

I consider my process to be of particular value in connection with one species of hydrocracking, namely, catalytic hydrodesulfurization. Examples of satisfactory catalysts which may be employed as regards this reaction are heavy metal alumino-silicates, cobalt thiomolybdate, tungsten-nickel-sulfide, tungsten-iron-sulfide, nickel, nickel oxide, nickel sulfide, molybdenum oxide, molybdenum-oxide-zinc oxide-magnesia, molybdenum oxide-chromium oxide, nickel-copper-alumina, molybdic oxide-nickelous oxide, molybdic oxide, copper oxide, cobalt molybdate, molybdic and tungsten sulfides, each preferably being composited with a carrier. Iron, nickel, cobalt, their oxides, chromates, molybdates, and tungstates are very satisfactory catalysts. Other catalysts known for this purpose may also be used.

In the instances set forth above the catalyst may be employed with a porous support or carrier (which may possess some catalytic activity) such as microspheres of silica-alumina cracking catalyst or powdered activated alumina or silica-alumina. Powdered silica gel, kieselguhr, and acid treated pumice are further examples of satisfactory supports. Other powdered synthetic carriers which may be used are silica-zirconia, silica-titania, alumina-titania, and silica-alumina-boric oxide. These synthetic carriers may be produced by coprecipitation or other conventional methods.

The composite catalysts may be made by impregnating the microspheres or other powdered carrier with a solution of a soluble salt of the metal, such as a nitrate, followed by drying and calcining, and followed by reduction, if a metal or mixture of metal and oxide is to be used, or by sulfiding if a sulfide catalyst is desired. Alternatively, the hydrogenating component may be coprecipitated with the carrier components.

The size of the catalyst particles may vary considerably, the only requirement being that it should be small enough to be suspended by the current of gas and vapor passed through the catalyst bed. However, it is necessary to employ catalyst particles which are not so small as to be carried along by the gas and vapor stream, if a non-transport type of operation is employed. Particles having a diameter falling between about 400 and 50 mesh are satisfactory. Most commercial catalysts are a mixture of particles having a variety of diameters, but these particles are almost entirely within the above diameter range. It is advantageous to use such mixtures, but mixtures containing large amounts of large or fine material, i. e., near or larger than 50 mesh or near or smaller than 400 mesh should be avoided.

The on-stream period for the individual reactor should be terminated when the activity of the catalyst has been substantially reduced. In connection with most of the catalysts listed above, the reduction of activity is due primarily to coke laydown. In some instances sulfiding of the metal or oxide compounds may occur. However, in most cases the sulfide is an effective catalyst. Oxidative regeneration operates to remove both contaminants and reactivate the catalysts.

The temperature range for processing operations in accordance with my invention varies depending upon the reaction involved, i. e., the temperatures used are those conventional for the particular reaction being carried out. For example, a reaction temperature range of between about 100° F. and about 600° F. is generally employed for non-destructive hydrogenation. Destructive hydrogenation, hydrocracking and hydrodesulfurization usually involve a temperature of between about 600° F. and about 1000° F. A temperature range of about 225° F. to about 650° F. is usually employed for polymerization reactions, the temperature varying according to the particular catalysts and pressures involved. As regards destructive hydrogenation (hydrocracking and/or hydrodesulfurization) of heavy charge stocks, temperatures between about 750° and 950° F. are most useful, and especially those between 800° and 870° F. However, lower or higher temperatures may be used.

My invention is useful for processes involving substantially different pressures in the reactor and regenerator. Since regeneration in the present invention is carried out in a different vessel, isolated from the on-stream reactor, it may be operated at a widely different pressure. Generally speaking, the pressure employed in the reactor may vary quite widely, from about 100 p. s. i. g. to about 3000 p. s. i. g. depending upon the particular reaction involved.

In reactions involving hydrogen treatment of hydrocarbons, the hydrogen to oil ratio may be varied over an extremely wide range, but it is desirably between about 300 and 20,000 s. c. f./bbl. (standard cubic feet per barrel). Ratios above about 1000 s. c. f./bbl. are useful in connection with the treatment of heavy charge stock. I have found that any hydrogen purity above about 50 per cent produces satisfactory results, in modifications of my process which involve hydrocracking. In all instances the rates of flow of the reactants are correlated to produce fluidization of the catalyst bed.

Any reactants which exist in gaseous, vapor or in mixed liquid-vapor form at reaction conditions may be employed, so long as they produce an approximately neutral to exothermic reaction or may be reacted at least at a substantially neutral heat balance.

As regards hydrocarbons, my invention is applicable to any charge stock as long as it may exist in vapor or mixed liquid-vapor form at reaction conditions. My invention is particularly useful as applied to conversion of heavy charge stocks such as total, reduced or topped crude and especially those of low API gravity and high sulfur content. This is true, since my invention is adapted to economically process charge stock in a reaction involving the removal of relatively large amounts of contaminants from the catalyst.

Regeneration is carried out at a temperature sufficient to remove contaminants or otherwise restore the activity of the catalyst, but insufficient to cause damage to the catalyst particles by overheating. For example, a satisfactory temperature for burning off carbonaceous deposits may vary from about 850° to 1200° F., and preferably in the range of about 950° to 1150° F.

While regeneration under pressure is desirable from a rate standpoint, economical considerations and the mechanical difficulties involved presently indicate perferred regeneration pressure of about 50 p. s. i. g., or less, i. e., substantially atmospheric pressure.

The rate of flow of gas or vapor through the catalyst bed of either the reactor or regenerator may vary widely. In other words, the degree of fluidization may be the same or different in the two vessels. Advantageously, the degree of fluidization in the reactor is somewhat less extreme than that normally employed in fluidized beds and in the regenerator. This procedure allows the utilization of a smaller, less expensive, reactor, particularly in connection with heavy-walled pressure vessels.

Advantages of my invention are that fluctuation of the catalyst bed in the regenerator has been reduced substantially and undue mixing of active and inactive catalyst is avoided, thus enabling the return of catalyst of a higher activity level to the reactor. A further advantage is the provision of an improved cooling method which avoids the harmful effects of excessive thermal strains. An additional advantage is the provision of a method allowing the measuring of an exact catalyst charge into a heavy-walled pressure vessel. These advantages may be accomplished while at the same time avoiding repeated starting-up of the regenerator, providing a constant on-stream capacity, and minimizing the off-stream time for each reactor.

What I claim is:

1. In a catalytic conversion having an approximately neutral to exothermic heat balance, the steps comprising passing a reactant through a reactor containing a fluidized catalyst bed at elevated temperature and pressure, maintaining a fluidized bed of catalyst in a separate regenerator at a substantially lower pressure than said elevated pressure, terminating the flow of reactant when the activity of the catalyst in the reactor is substantially reduced, depressuring the reactor, at least partially filling a hopper between the regenerator and reactor with a substantial amount of catalyst, said hopper, reactor and regenerator, each being connected to both of the others to form a three-vessel system through which catalyst may be moved from time to time and the aforesaid catalyst at least partially filling said hopper coming from the next preceding vessel in the system, emptying the reactor into the next following vessel in the system, completing the filling of the hopper with a reactor charge of catalyst, transferring a charge of active catalyst to the reactor from the next preceding vessel in the system, repressuring the reactor, and again passing reactant through the reactor and, during a substantial part of the time in which the flow of reactant is terminated, introducing deactivated catalyst into the regenerator from the next preceding vessel in the system and removing reactivated catalyst therefrom into the next following vessel in the system, such introduction and removal being at such rates as to maintain an approximately constant level of catalyst in the regenerator.

2. In a catalytic conversion having an approximately neutral to exothermic heat balance, the steps comprising passing a reactant through a reactor containing a fluidized catalyst bed at elevated temperature and pressure, maintaining a fluidized bed of catalyst in a separate, continuously operating regenerator at a substantially lower pressure than said elevated pressure, terminating the flow of reactant when the activity of the catalyst in the reactor is substantially reduced, depressuring the reactor, transferring deactivated catalyst from the reactor to the regenerator and removing active catalyst from the regenerator to a hopper, said transferring and removing being carried out so as to result in an approximately constant level of catalyst in the regenerator during a substantial portion of the transferring and removing operations, transferring a charge of active catalyst from the hopper to the reactor, repressuring the reactor and again passing reactant through the catalyst bed in the repressured reactor.

3. In a catalytic conversion having an approximately neutral to exothermic heat balance, the steps comprising passing a reactant through a reactor containing a fluidized catalyst bed at elevated temperature and pressure, maintaining a fluidized bed of catalyst in a separate, continuously operating regenerator at a substantially lower pressure than the pressure in the reactor, terminating the flow of reactant when the activity of the catalyst in the reactor is substantially reduced, depressuring the reactor, partially filling a hopper between the regenerator and reactor with a substantial amount of catalyst contained in the regenerator, emptying the catalyst in the depressured reactor into the regenerator, completing the filling of the hopper with a reactor charge of catalyst, cooling the catalyst in the hopper, transferring a charge of cooled active catalyst to the reactor from the hopper, repressuring the reactor, and again passing reactant through the reactor and, during a substantial part of the time in which the flow of reactant is terminated, simultaneously introducing deactivated catalyst from the depressured reactor into the regenerator and removing reactivated catalyst from the regenerator into the hopper, such introduction and removal being at such rates as to maintain an approximately constant level of catalyst in the regenerator.

4. In a catalytic conversion having an approximately neutral to exothermic heat balance, the steps comprising passing a reactant through a plurality of reactors at elevated temperature and pressure, each of said reactors containing a fluidized bed of catalyst, the catalyst beds in said reactors being of progressively decreasing activity, taking off-stream the reactor containing the least active catalyst by terminating the flow of reactant therethrough, switching the flow to an additional reactor containing active catalyst, depressuring the off-stream reactor and transferring its charge of deactivated catalyst to a regenerator operating continuously at a substantially lower pressure than said elevated pressure and containing a body of catalyst in fluidized form, partially filling a hopper from the regenerator before a substantial amount of deactivated catalyst has been transferred to the regenerator, simultaneously completing the filling of the hopper and transferring of catalyst to the regenerator from the off-stream reactor so as to result in an approximately constant level of catalyst in the regenerator during said simultaneous filling and transferring operations, completing transfer from the off-stream reactor to the regenerator, introducing the charge of reactivated catalyst contained in the hopper into the empty reactor, repressuring this reactor, terminating the flow of reactant through the next least active catalyst bed, switching this flow to the refilled reactor, repeating the termination and catalyst transfer operations on each reactor in succession at such times as the catalyst therein becomes sufficiently inactive to require regeneration and at intervals such as to provide continuous operation of the regenerator.

5. In a catalytic conversion having an approximately neutral to exothermic heat balance, the steps comprising passing a reactant through a plurality of reactors at elevated temperature and pressure, each of said reactors containing a fluidized bed of catalyst which is substantially unrenewed throughout said passage, said plurality of reactors being divided into at least two banks, the catalyst beds in said reactors being of progressively decreasing activity, taking off-stream the reactor in the first bank containing the least active catalyst by terminating the flow of reactant therethrough, switching this flow to a reactor in a second bank containing active catalyst, depressuring the off-stream reactor and transferring its charge of deactivated catalyst to a regenerator operating continuously at substantially atmospheric pressure and containing a body of catalyst in fluidized form, partially filling a hopper from the regenerator before transfer of a substantial amount of deactivated catalyst to the regenerator, simultaneously completing the filling of the catalyst hopper and transferring of catalyst to the regenerator from the off-stream reactor so as to obtain an approximately constant level of catalyst in the regenerator during said simultaneous filling and transferring operations, completing transfer from the off-stream reactor to the regenerator, introducing the charge of reactivated catalyst in the hopper into the empty reactor, repressuring this reactor, terminating the flow of reactant through the reactor in the second bank containing the least active catalyst, switching this flow of reactant to the refilled reactor in the first bank, repeating the termination and catalyst transfer operations on each reactor in succession at such times as the catalyst therein requires regeneration, the number of reactors being sufficient to provide a constant on-stream capacity, each bank of reactors being serviced by its own hopper and the operation of the individual reactors being substantially continuous except for catalyst substitution operations.

PAUL W. CORNELL.

References Cited in the file of this patent

UNITED STATES PATENTS

| Number | Name | Date |
|---|---|---|
| 2,265,837 | Harding | Dec. 9, 1941 |
| 2,273,864 | Houdry | Feb. 24, 1942 |
| 2,356,717 | Williams | Aug. 22, 1944 |
| 2,417,164 | Huber | Mar. 11, 1947 |
| 2,434,537 | Barr et al. | Jan. 13, 1948 |
| 2,515,373 | Keith et al. | July 18, 1950 |

FOREIGN PATENTS

| Number | Country | Date |
|---|---|---|
| 383,616 | Great Britain | Feb. 13, 1931 |